(12) United States Patent
Bhosale et al.

(10) Patent No.: US 10,195,770 B2
(45) Date of Patent: Feb. 5, 2019

(54) METHOD OF FORMING A STRUCTURAL OIL PAN VIA LOST CORE MOLDING

(71) Applicant: BASF SE, Ludwigshafen (DE)

(72) Inventors: Ankur M. Bhosale, Canton, MI (US); Raymond Ballou, Milford, MI (US); Sascha Klausen, Waterford, MI (US)

(73) Assignee: BASF SE, Ludwigshafen am Rhein (DE)

( * ) Notice: Subject to any disclaimer, the term of this patent is extended or adjusted under 35 U.S.C. 154(b) by 246 days.

(21) Appl. No.: 15/027,730

(22) PCT Filed: Oct. 8, 2014

(86) PCT No.: PCT/US2014/059751
§ 371 (c)(1),
(2) Date: Apr. 7, 2016

(87) PCT Pub. No.: WO2015/054420
PCT Pub. Date: Apr. 16, 2015

(65) Prior Publication Data
US 2016/0263782 A1 Sep. 15, 2016

Related U.S. Application Data

(60) Provisional application No. 61/888,430, filed on Oct. 8, 2013.

(51) Int. Cl.
*B28B 7/22* (2006.01)
*B29C 41/14* (2006.01)
(Continued)

(52) U.S. Cl.
CPC .............. *B29C 41/14* (2013.01); *B29C 41/22* (2013.01); *B29C 41/40* (2013.01); *B29C 41/42* (2013.01);
(Continued)

(58) Field of Classification Search
CPC ......... B29C 41/14; B29C 41/22; B29C 41/40; B29C 41/42; B29C 33/52; B29C 45/4457
See application file for complete search history.

(56) References Cited

U.S. PATENT DOCUMENTS 3,449,482 A 6/1969 Mitchell et al.
3,941,157 A 3/1976 Barnett
(Continued)

FOREIGN PATENT DOCUMENTS

CA 1069298 A 1/1980
DE 3830966 C1 5/1989
(Continued)

OTHER PUBLICATIONS

Chemanager, Polyamide Oil Pans for Trucks, Jun. 10, 2011, Chemanager-Online, https://www.chemanager-online.com/en/topics/chemicals-distribution/polyamide-oil-pans-trucks (Year: 2011).*
(Continued)

*Primary Examiner* — William P Bell
*Assistant Examiner* — Andrew L Swanson
(74) *Attorney, Agent, or Firm* — DLA Piper LLP (US)

(57) ABSTRACT

A method of forming a structural oil pan via lost core molding is disclosed. The structural oil pan comprises a bracket portion configured for mounting to the vehicle, a pan portion integrated with the bracket portion and defining an oil reservoir, and a structural section formed via lost core molding and defining a cavity. The method comprises the step of lost core molding by forming a metal core, molding the bracket portion and/or the pan portion about the metal core, and removing the metal core to form the structural section in at least one of the bracket portion and the pan portion. The method also includes co-molding the bracket portion and the pan portion together to form the structural oil pan.

19 Claims, 9 Drawing Sheets

(51) Int. Cl.
| | |
|---|---|
| F01M 11/00 | (2006.01) |
| B29C 41/22 | (2006.01) |
| B29C 41/40 | (2006.01) |
| B29C 41/42 | (2006.01) |
| B29K 77/00 | (2006.01) |
| B29K 307/04 | (2006.01) |
| B29K 309/08 | (2006.01) |
| B29L 31/00 | (2006.01) |

(52) U.S. Cl.
CPC ..... *F01M 11/0004* (2013.01); *B29K 2077/00* (2013.01); *B29K 2307/04* (2013.01); *B29K 2309/08* (2013.01); *B29K 2995/0017* (2013.01); *B29K 2995/0089* (2013.01); *B29L 2031/712* (2013.01); *F01M 2011/002* (2013.01); *F01M 2011/0008* (2013.01); *F01M 2011/0058* (2013.01); *F01M 2011/0091* (2013.01)

(56) References Cited

U.S. PATENT DOCUMENTS

| | | | |
|---|---|---|---|
| 4,105,236 | A | 8/1978 | Harr |
| 4,930,469 | A | 6/1990 | Kamprath et al. |
| 5,934,241 | A | 8/1999 | Von Esebeck et al. |
| 6,131,543 | A | 10/2000 | Achenbach et al. |
| 6,523,561 | B2 | 2/2003 | Kapcoe et al. |
| 6,539,912 | B1 | 4/2003 | Beer |
| 6,550,440 | B1 | 4/2003 | Vrsek et al. |
| 6,584,950 | B1 * | 7/2003 | Cunningham ..... F01M 11/0004 123/195 C |
| 6,588,557 | B2 | 7/2003 | Williams et al. |
| 6,705,270 | B1 | 3/2004 | Rau et al. |
| 7,219,642 | B1 | 5/2007 | Kwiatkowski et al. |
| 8,113,167 | B2 | 2/2012 | Jessberger et al. |
| 2002/0100641 | A1 | 8/2002 | Osman |
| 2003/0183983 | A1 | 10/2003 | Schmidt |
| 2004/0200452 | A1 | 10/2004 | Higashide et al. |
| 2010/0212623 | A1 * | 8/2010 | Jessberger ......... F01M 11/0004 123/196 R |
| 2011/0147128 | A1 | 6/2011 | Schrade et al. |
| 2014/0069940 | A1 * | 3/2014 | Griffiths ............. F01M 11/0004 220/659 |

FOREIGN PATENT DOCUMENTS

| | | |
|---|---|---|
| DE | 19619977 A1 | 12/1997 |
| DE | 10026113 A1 | 11/2001 |
| DE | 60124084 T2 | 2/2007 |
| EP | 1253299 A2 | 10/2002 |
| EP | 1498598 A1 | 1/2005 |
| EP | 1731725 A2 | 12/2006 |
| FR | 2 745 034 A1 | 8/1997 |
| JP | H 01-126412 A | 5/1989 |
| JP | 2003-001030 A | 1/2003 |
| JP | 2004-132317 A | 4/2004 |
| JP | 2005-271816 A | 10/2005 |
| JP | 2010-084561 A | 4/2010 |
| JP | 2012-515095 A | 7/2012 |
| WO | WO 2010/042585 A1 | 4/2010 |
| WO | WO 2010100124 A1 | 9/2010 |

OTHER PUBLICATIONS

Plastics Today, Complex, Hollow Design? Consider Metal Core Molding, Jun. 30, 1997, Plastics Today, https://www.plasticstoday.com/content/complex-hollow-design-consider-metal-core-molding/502120838739 (Year: 1997).*

Plastics Today, Plastic Oil Sumps Offer Further Lightweighting Options, Jun. 20, 2013, Plastics Today https://www.plasticstoday.com/content/plastic-oil-sumps-offer-further-lightweighting-options/78959731719011 (Year: 2013).*

BASF, Ultramid® B3ZG7 OSI BK23273 Polyamide 6, Sep. 16, 2011 (internet archive capture date), BASF, https://web.archive.org/web/20110916070919/http://iwww.plasticsportal.com/products/datasheet.html?type=iso&param=Ultramid+B3ZG7+OSI+BK23273 ( Year: 2011).*

Liu, S.-J, Manufacturing Techniques for Polymer Matrix Composites (PMCs), 2012, Woodhead Publishing Limited, p. 33 (Year: 2012).*

Lee, Dong Woo, Electrical and Mechanical Properties of Carbon/Glass Hybridized Long Fiber Reinforced Polyproplyene Composites, Jul. 2013, Macromolecular Research, vol. 21 No. 7, p. 767-777 (Year: 2013).*

English language abstract and machine-assisted English translation for FR 2 745 034 extracted from espacenet.com database on Sep. 28, 2016, 11 pages.

English language abstract and machine-assisted English translation for JP 2004-132317 extracted from espacenet.com database on Sep. 28, 2016, 7 pages.

English language abstract and machine-assisted English translation for JP 2010-084561 extracted from espacenet.com database on Sep. 28, 2016, 19 pages.

International Search Report for Application No. PCT/US2014/059751 dated Dec. 17, 2014, 3 pages.

English language abstract and machine-assisted English translation for JPH 01-126412 extracted from the PAJ database on Aug. 12, 2016, 6 pages.

English language abstract for JP 2012-515095 extracted from espacenet.com database on Aug. 12, 2016, 1 page.

English language abstract not found for DE3830966, however see English Equivalent U.S. Pat. No. 4,930,469. Original document extracted from espacenet.com database on Apr. 14, 2016, 6 pages.

English language abstract for DE 19619977 extracted from espacenet.com database on Apr. 14, 2016. 8 pages. Also see English equivalent U.S. Pat. No. 5,934,241.

English language abstract and machine-assisted English translation for DE 10026113 extracted from espacenet.com database on Jul. 10, 2012, 8 pages.

English language abstract for DE 60124084 extracted from espacenet.com database on Apr. 14, 2016. 11 pages. Also see English equivalent U.S. Pat. No. 6,705,270.

English language abstract and machine-assisted English translation for EP 1253299 extracted from espacenet.com database on May 30, 2014, 25 pages.

English language abstract and machine-assisted English translation for EP 1498598 extracted from espacenet.com database on May 30, 2014, 28 pages.

English language abstract and machine-assisted English translation for JP 2003-001030 extracted from espacenet.com database on May 30, 2014, 29 pages.

English language abstract and machine-assisted English translation for JP 2005-271816 extracted from espacenet.com database on Jul. 10, 2012, 33 pages.

Dupont, Design Guide—Module 1, "General Design Principles for Dupont Enginerring Polymers", Copyright 2000, E.I. duPont de Memours and Company, 136 pages.

European Search Report EP 08 15 9840 dated Oct. 4, 2011, 2 pages.
International Search Report PCT/US2014/059720 dated Dec. 17, 2014, 3 pages.

* cited by examiner

METHOD OF FORMING A STRUCTURAL OIL PAN VIA LOST CORE MOLDING

RELATED APPLICATIONS

This application is the National Stage of International Patent Application No. PCT/US2014/059751, filed on Oct. 8, 2014, which claims priority to U.S. Provisional Patent Application Ser. No. 61/888,430, filed on Oct. 8, 2013, the contents of each of which are expressly incorporated herein by reference in one or more non-limiting embodiments.

BACKGROUND OF THE DISCLOSURE

1. Field of the Disclosure

The subject disclosure generally relates to a method of forming a structural oil pan via lost core molding.

2. Description of the Related Art

Articles which require chemical resistance, impact resistance, and structural integrity are often formed from metals such as steel and aluminum. However, the cost of metals has increased. As such, alternatives to metal, such as polymeric materials, are now being considered for use in forming such articles formed from metal. Articles formed from polymeric materials weigh less and are often less expensive than articles formed from metal. However, articles formed from polymeric materials must often meet or exceed stringent, predetermined design requirements for chemical resistance, impact resistance, as well as various structural and acoustic requirements over a range of temperatures.

Oil pans (fluid reservoirs) for internal combustion engines are a specific example of such an article formed from metal. In an effort to reduce the cost and the weight of oil pans, composite oil pans formed from polymeric materials and metal have been proposed. However, the use of metal, in particular metal brackets, in these composite oil pans is still required to meet the stringent, predetermined design requirements for oil pans.

Accordingly, there remains a need for a method of forming an oil pan formed from polymeric material.

SUMMARY OF THE DISCLOSURE AND ADVANTAGES

A method of forming a structural oil pan via lost core molding is disclosed. The structural oil pan comprises a bracket portion configured for mounting to the vehicle, a pan portion integrated with the bracket portion and defining an oil reservoir, and a structural section formed via lost core molding and defining a cavity. The method comprises the step of lost core molding by forming a metal core, molding the bracket portion and/or the pan portion about the metal core, and removing the metal core to form the structural section in at least one of the bracket portion and the pan portion. The method also includes the step of co-molding the bracket portion and the pan portion together to form the structural oil pan.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE DISCLOSURE

Figure 1A:
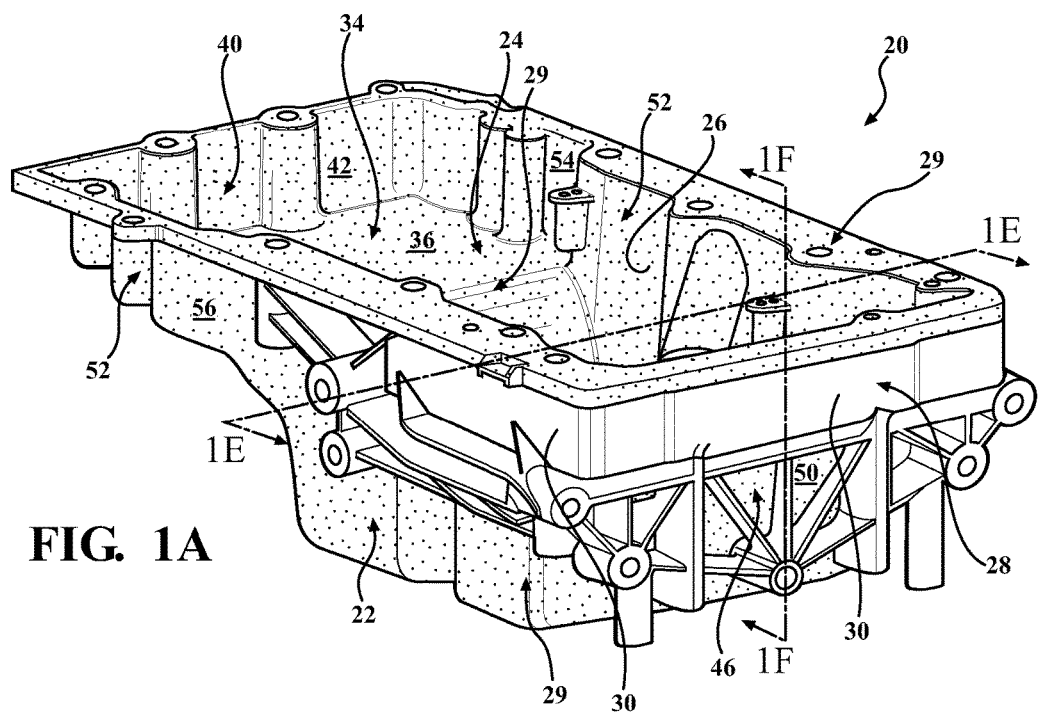
FIG. 1A is a perspective front view of a first embodiment of a structural oil pan including a bracket portion including a structural section and configured for mounting to the vehicle, and a pan portion integrated with the bracket portion and defining an oil reservoir.

Referring to the Figures, wherein like numerals indicate corresponding parts throughout the several views, a structural oil pan (hereinafter referred to as both "oil pan" or "structural oil pan") is shown generally at 20. The oil pan 20 in all embodiments of this invention is formed via lost core molding. The oil pan 20 is formed, or manufactured from, a polymeric material, i.e., a plastic material. In the context of the present disclosure, it should be understood that the polymeric material can be neat, i.e., virgin, uncompounded resin, or that the polymeric material can be an engineered product where the resin is compounded with other components, for example with select additives to improve certain physical properties. Such additives include, but are not limited to, lubricants, reinforcing agents, impact modifiers, coupling agents, and colorants, such as pigments and the like.

The polymeric material includes a polymer, such as a polyamide. The polymer is present in the polymeric material in an amount of from about 10 to about 90, alternatively from 20 to 80, alternatively from 30 to 70, alternatively from 45 to 65, alternatively from 50 to 60, parts by weight based on a total weight of the polymeric material. The amount of polymer present in the polymeric material may vary outside of the ranges above, but is typically both whole and fractional values within these ranges.

When the polymeric material comprises polyamide, the polyamide is selected from the group of polyamide 6, polyamide 66, polyamide 46, polyamide 610, polyamide 6I/6T, polyamide 11, polyamide 12, polyamide 1010, polyamide 612, and combinations thereof. However, it should be understood that polymeric materials other than polyamides may also be used to manufacture the oil pan 20.

The polymeric material typically comprises a reinforcing agent for imparting durability and rigidity to the polymeric material. The reinforcing agent may be particulate in form, or may be fibrous in form. Non-limiting examples of reinforcing agents in particulate form include wollastonite, calcium carbonate, calcium sulfate, kaolin, mica, silica, talc, carbon black, and/or alumina silicate. Non-limiting examples of reinforcing agents in fibrous form include glass fibers, carbon fibers, metallic fibers (e.g. stainless steel), polymeric fibers, sisal, and/or boron. The fibers of the reinforcing agent may vary in size (e.g. length, diameter, etc.) and may be coated or uncoated.

In one embodiment, the reinforcing agent comprises a plurality of fibers. However, it is to be appreciated that the reinforcing agent can be selected from the group of fibers, particles, and combinations thereof. In one embodiment, the reinforcing agent comprises carbon fibers. Of course, it should be appreciated that the reinforcing agent can comprise fibers of other materials, such as metal, polymers, sisal, or boron.

In various embodiments, the fibers have an average diameter of less than 13, alternatively less than 10, alternatively from 1 to 5, micrometers. In various embodiments, the fibers have an average length of from 0.1 to 20, alternatively from 0.1 to 13, alternatively from 0.1 to 1, alternatively from 1 to 10, alternatively from 1 to 5, mm. In one embodiment, the fibers comprise "short' carbon fibers having a length of less than 1 mm. In another embodiment, the fibers comprise "long" carbon fibers having a length of greater than 1 mm.

The polymeric material or the fibers themselves may include other components to encourage bonding between the polymeric material and the fibers.

Suitable glass fibers are commercially available from PPG Industries Inc. under the trade name CHOPVANTAGE®. Suitable carbon fibers are commercially available from Toho-Tenax of Rockwood, Tenn. under the trade name TENAX®.

When employed, the reinforcing agent is present in an amount of from 15 to 65, alternatively from 25 to 50, alternatively from 30 to 40, alternatively from 45 to 55, parts by weight based on a total weight of the polymeric material. The amount of reinforcing agent present in the polymeric material may vary outside of the ranges above, but is typically both whole and fractional values within these ranges.

The polymeric material may comprise an impact modifier for imparting excellent impact resistance to the polymeric material. When employed, the impact modifier is present in an amount of from 1 to 20, alternatively from 3 to 15, alternatively from 4 to 10 parts by weight based on a total weight of the polymeric material. If present, the amount of impact modifier present in the polymeric material may vary outside of the ranges above, but is typically both whole and fractional values within these ranges.

The impact modifier is selected from the group of elastomers, ionomers, ethylene copolymers, ethylene-propylene copolymers, ethylene-propylene-diene terpolymers, ethylene-octene copolymers, ethylene-acrylate copolymers, styrene-butadiene copolymer, styrene-ethylene/butylene-styrene terpolymers and combinations thereof. In various embodiments, the impact modifier comprises at least one of ethylene octene, ethylene propylene, or combinations thereof. Suitable impact modifiers are commercially available from DuPont Company of Wilmington, Del. under the trade name FUSABOND®.

Although not required, the polymeric material may also comprise a heat stabilizer for imparting resistance to thermal degradation of the polymeric material. When employed, the heat stabilizer is present in an amount of from 0.01 to 1, alternatively from 0.01 to 0.6, alternatively from 0.08 to 0.2 parts by weight based on a total weight of the polymeric material. If present, the amount of heat stabilizer present in the polymeric material may vary outside of the ranges above, but is typically both whole and fractional values within these ranges.

The heat stabilizer may be selected from the group of organic heat stabilizers, inorganic heat stabilizers, and combinations thereof. In various embodiments, the heat stabilizer comprises at least one of cuprous iodide, potassium iodide, potassium bromide, or combinations thereof. Suitable heat stabilizers are commercially available from Ajay North America of Powder Springs, Ga. under the trade name IODEAL®.

Although not required, the polymeric material may comprise a lubricating agent for allowing the polymeric material to be removed from a mold during formation of the oil pan 20. When employed, the lubricating agent is present in an amount of from 0.01 to 1, alternatively from 0.1 to 0.8, alternatively from 0.2 to 0.6, parts by weight based on a total weight of the polymeric material. If present, the amount of lubricating agent present in the polymeric material may vary outside of the ranges above, but is typically both whole and fractional values within these ranges.

The lubricating agent may be selected from the group of hydrocarbon wax, paraffins, metal soaps, saturated and unsaturated fatty acids, fatty alcohols, esters, amides, and combinations thereof. In one embodiment, the lubricating agent comprises N,N'-ethylene bis-stearamide. Suitable lubricating agents are commercially available from Lonza Incorporated of Fair Lawn, N.J. under the trade name ACRAWAX®.

The polymeric material may comprise colorants and other additives.

The polymeric material is durable and resistant to fracturing upon impact with an object, such as a stone, over a wide range of temperatures varying in the ranges of minus 40° C. to 150° C. Although not required, the polymeric material typically has: a modulus of elasticity (Young's Modulus) of from 2,000 to 50,000 MPa; a fatigue strength of from 10 to 120 MPa; a drop weight unnotched impact strength of from 40 to 113 $kJ/m^2$; a notched impact strength of from 10 to 35 $kJ/m^2$.

Suitable polymeric materials are commercially available from BASF® Corporation of Florham Park, N.J. under the trade name ULTRAMID®.

The oil pan 20 may be formed from more than one polymeric material. In one embodiment, an oil pan 20 has an exterior surface 22, an interior surface 24 defining an oil reservoir 26, and a bracket portion 28. In this embodiment, the bracket portion 28 of the oil pan 20 is formed from a first polymeric material and the remaining portion of the oil pan 20 (e.g. a pan portion 29 as described below) is formed from a second polymeric material as described additionally below.

The first polymeric material comprises a polyamide selected from the group of polyamide 6, polyamide 66, polyamide 46, polyamide 610, polyamide 6I/6T, polyamide 11, polyamide 12, polyamide 1010, polyamide 612, and combinations thereof. In various embodiments, the first polymeric material comprises polyamide 6, polyamide 66, or combinations thereof. In one embodiment, the first polymeric material comprises polyamide 6.

In various embodiments, the first polymeric material comprises "long" carbon fiber having: an average diameter of less than 10, alternatively form 2 to 10, micrometers; and an average length of greater than 1.0, alternatively from 1.0 to 30, mm. In one specific embodiment, carbon fibers of about 24.5 mm are compounded with polyamide and then break upon processing to result in an average length of from 3 to 6 mm. The first polymeric material can comprise greater than 35, alternatively from 40 to 70, alternatively from 45 to 55, parts by weight of the "long" carbon fiber based on 100 parts by weight of the first polymeric material. Of course, the first polymeric material is a type of polymeric material and the ranges set forth above for the polymeric material also apply.

Suitable first polymeric materials are commercially available from BASF Corporation of Florham Park, N.J. under the trade name ULTRAMID®. One specific example of a suitable first polymeric material is ULTRAMID® XA3321.

The second polymeric material comprises a polyamide selected from the group of polyamide 6, polyamide 66, polyamide 46, polyamide 610, polyamide 6I/6T, polyamide 11, polyamide 12, polyamide 1010, polyamide 612, and combinations thereof. In various embodiments, the second polymeric material comprises polyamide 6, polyamide 66, or combinations thereof. In one embodiment, the second polymeric material comprises polyamide 6.

In various embodiments, the second polymeric material comprises "short" glass fiber having: an average diameter of less than 10, alternatively form 2 to 10, micrometers; and an average length of less than 1.0, alternatively from 0.1 to 1, mm. The second polymeric material can comprise greater than 20, alternatively from 25 to 45, alternatively from 30 to 40, parts by weight of the "short" glass fiber based on 100 parts by weight of the second polymeric material. Of course, the second polymeric material is a type of polymeric material and the ranges set forth above for the polymeric material also apply.

The second polymeric material is resistant to fracturing upon impact with an object, such as a stone, over a wide range of temperatures. In one embodiment, the second polymeric material has an Izod notched impact strength of greater than 15 KJ/m$^2$ at 23° C. and greater than 10 KJ/m$^2$ at −40° C. when tested in accordance with ISO Test method 179/1 eA.

Suitable second polymeric materials are commercially available from BASF Corporation of Florham Park, N.J. under the trade name ULTRAMID®. One specific example of a suitable second polymeric material is ULTRAMID® B3ZG7 OSI.

Notably, the first and second polymeric materials described above can be the same or different. To this end, it is to be understood that the first and second polymeric materials can both include, for example, polyamide 6. In certain embodiments, the second polymeric material is different than the first polymeric material with respect to the content of the respective reinforcing agent. As a more specific example, both the first and second polymeric materials may include polyamide 6, yet the first polymeric material may include carbon fiber as its reinforcing agent, and the second polymeric material may include glass fiber as its reinforcing agent. In this more specific example, the first and second polymeric materials are per se different (due to the reinforcing agent content), even though they both include polyamide 6 as their base polymer.

In one embodiment, the oil pan 20 is 'integrally' formed from polymeric material. By integral, it is meant that the oil pan 20 is not a metal-polymer composite, but is formed substantially from a polymeric material or formed substantially from polymeric materials.

In another embodiment, the oil pan 20 includes the bracket portion 28 configured for mounting to the vehicle, and the pan portion 29 integrated with the bracket portion 28 and defining the oil reservoir 26.

The oil pan 20 also includes a structural section 30 defining a cavity 32 within at least one of the bracket portion 28 and the pan portion 29 for reducing vibration. In other words, the structural section 30 may be in only the bracket portion 28, only in the pan portion 29, or in both the bracket portion 28 and the pan portion 29. In one embodiment, the structural section 30 is disposed in the bracket portion 28 such that the cavity 32 is defined within the bracket portion 28. In another embodiment, the structural section 30 is disposed in the pan portion 29 such that the cavity 32 is defined within the pan portion 29. The structural section 30 has a cross-sectional shape selected from the group of rectangular, triangular, ovular, and circular. Because the cavity 32 is defined by the structural section 30, the shape of the cavity 32 follows the shape of the structural section 30. As such, the cavity 32 also has a cross-sectional shape selected from the group of rectangular, triangular, ovular, and circular. In one embodiment, the structural section 30 is a box section having a rectangular cross-sectional shape. In this embodiment, the structural section 30 itself includes a box top, a box bottom, and two box lateral sides as illustrated in the Figures. In one embodiment, the structural section 30 and cavity 32 defined therein is particularly effective when included in the bracket portion 28 which is co-molded, in one example over molded, onto the exterior surface 22 of the pan portion 29.

The structural section 30 and cavity 32 therein impacts, i.e., improves, the overall rigidity and acoustic properties of the oil pan 20. The structural section 30 and cavity 32 thereof are formed via lost core molding, as is described in detail below.

The oil pan 20 for an internal combustion engine is shown in the Figures. It should be understood that the oil pan 20 may be for any type of vehicle, such as an automobile, a boat, a plane, a tractor, etc. Depending upon the specific use of the oil pan 20, the oil pan 20 may have to meet specific impact resistance and acoustic design requirements.

Referring now to FIG. 1, a perspective front view an embodiment of the oil pan 20 is shown having the exterior surface 22, the interior surface 24 defining the oil reservoir 26, and the bracket portion 28. In this embodiment, the bracket portion 28 includes the structural section 30 defining the cavity 32.

Still referring to FIG. 1, the pan portion 29 of this embodiment includes a floor 34 having an interior surface 36 and an exterior surface 38. The floor also has a first floor end and a second floor end opposite the first floor end. The oil pan 20 of this embodiment also includes a front wall 40 having an interior surface 42 and an exterior surface 44. This front wall 40 extends outwardly from the first floor end of the floor 34. The oil pan 20 of this first embodiment also includes a back wall 46 having an interior surface 48 and an exterior surface 50. This back wall 46 extends outwardly from the second floor end of the floor 34 in generally the same direction as the front wall 40. The oil pan 20 of this embodiment also includes a pair of side walls 52 each having an interior surface 54 and an exterior surface 56. The side walls 52 extending outwardly from the floor 34 in generally the same direction as the front and back walls 40, 46. The side walls 52 extend substantially parallel with one another. Further, the side walls 52 are connected to, and substantially perpendicular with, the front and back walls 40, 46. As such, the interior surfaces 36 of the floor 34 and the walls 40, 46, 52 define the oil reservoir 26.

Generally, when the oil pan 20 is coupled to a vehicle, the front wall 40 faces a front of the vehicle and the back wall 46 faces a rear of the vehicle. The oil reservoir 26 typically has a depth D1 which is less at the front wall 40 than a depth D2 at the back wall 46 for functional purposes such as impact resistance and aerodynamics. Of course, the orientation of the oil pan 20 in a vehicle can change, depending on the vehicle. To this end, the terms "front wall" and "back wall" are not limiting in scope since the orientation of the oil pan 20 can change while the concepts herein remain.

In one embodiment, the front wall 40 and the floor 34 of the oil pan 20 face the front of the vehicle, the front wall 40 and the floor 34 are the most likely to be impacted by an object such as a rock. As such, it is advantageous to form the front wall 40 and the floor 34, alternatively the pan portion 29, from a durable polymeric material such as the second polymeric material described above. Since the back wall 46 is often mounted to the engine block and interfaces with a transmission housing of the vehicle, the structural integrity and acoustic properties of the back wall 46 and, if included, the bracket portion 28 of the oil pan 20, must be optimal. As such, it is advantageous to form the bracket portion 28 from a more rigid polymeric material such as the first polymeric material described above.

The structural section 30 and cavity 32 reduce vibrations and improve the rigidity and acoustic performance of the oil pan 20 in the vehicle. Of course, the existence of the cavity 32, also reduces the weight of the oil pan 20 which, when used in a vehicle, equates to fuel savings. The structural section 30 may be disposed in the pan portion 29, such as in at least one of the walls of the pan portion 29. In one embodiment, structural section 30 is disposed in the side walls 52 and the back wall 46 of the pan portion 29.

In various embodiments, the bracket portion 28 is integrated with the side walls 52 and the back wall 46 of the pan portion 29. In this embodiment, the structural section 30 is disposed in the bracket portion 28 adjacent to the exterior surface 56 of at least one of the walls of the pan portion 29. In one embodiment, the structural section 30 is disposed in the bracket portion 28 adjacent to the exterior surfaces 54, 56 of the side walls 52 and the exterior surface 50 of the back wall 46 of the pan portion 29.

As set forth above, the structural section 30 and cavity 32 reduce vibrations and improve the rigidity and acoustic performance of the oil pan 20 in the vehicle. The structural section 30 can be located anywhere within the bracket portion 28 and the pan portion 29. Furthermore, the structural section 30 can be continuous or discontinuous. Said differently, the structural oil pan 20 can include one, continuous structural section 30, and therefore one continuous cavity 32, or can include more than one structural section 30, and therefore more than one cavity 32. Both the bracket portion 28 and the pan portion 29 can include the structural section 30. The structural section 30 can wrap around the entire exterior surface of the oil pan 20, spanning one, two, three, or all four sides of the oil pan 20. Furthermore, the structural section 30 can span an entire, or partial, length and/or width of the sides of the oil pan 20. The structural section 30 can be located anywhere in the bracket portion 28 and/or the pan portion 29.

Figure 1B:
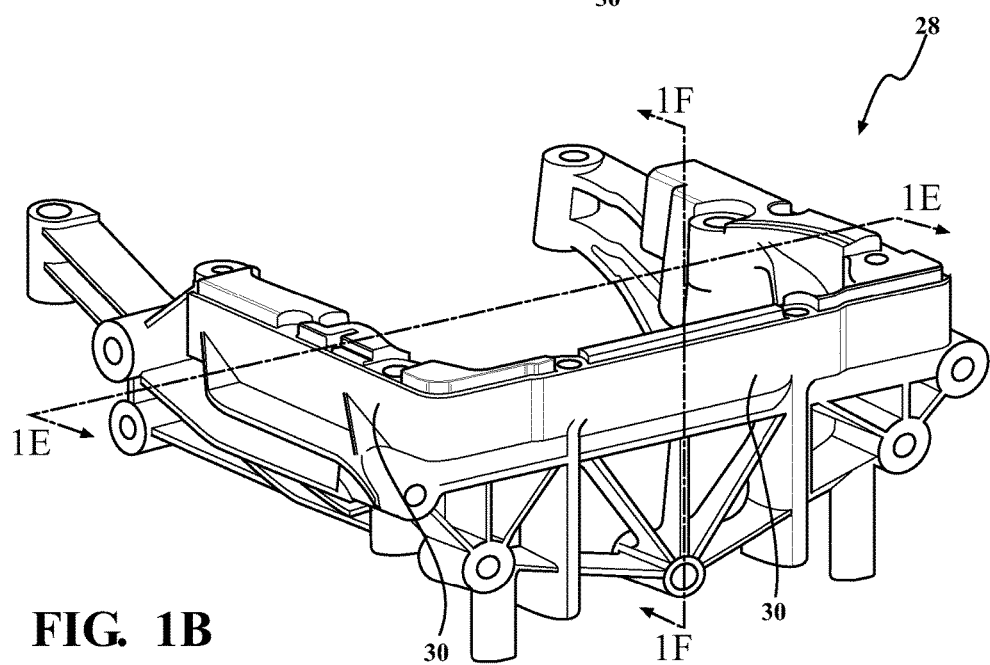
FIG. 1B is a perspective front view of the isolated bracket portion of the structural oil pan of FIG. 1A.
Figure 1C:
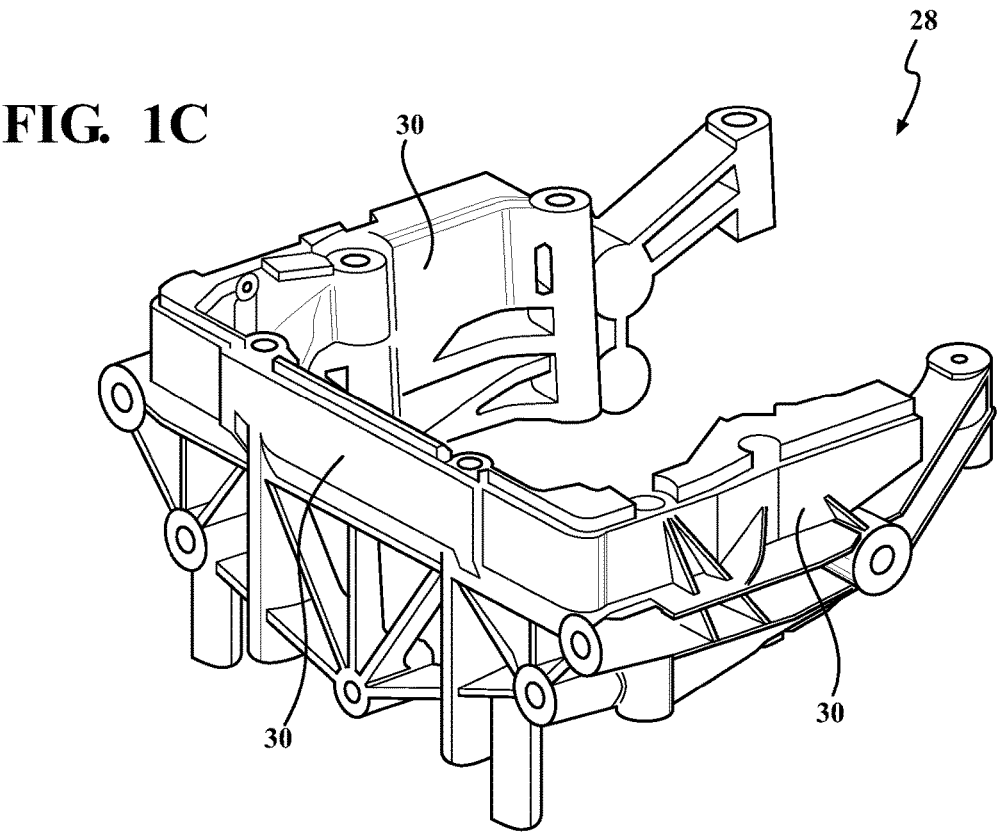
FIG. 1C is another perspective front view of the isolated bracket portion of the structural oil pan of FIG. 1A.
Figure 1D:
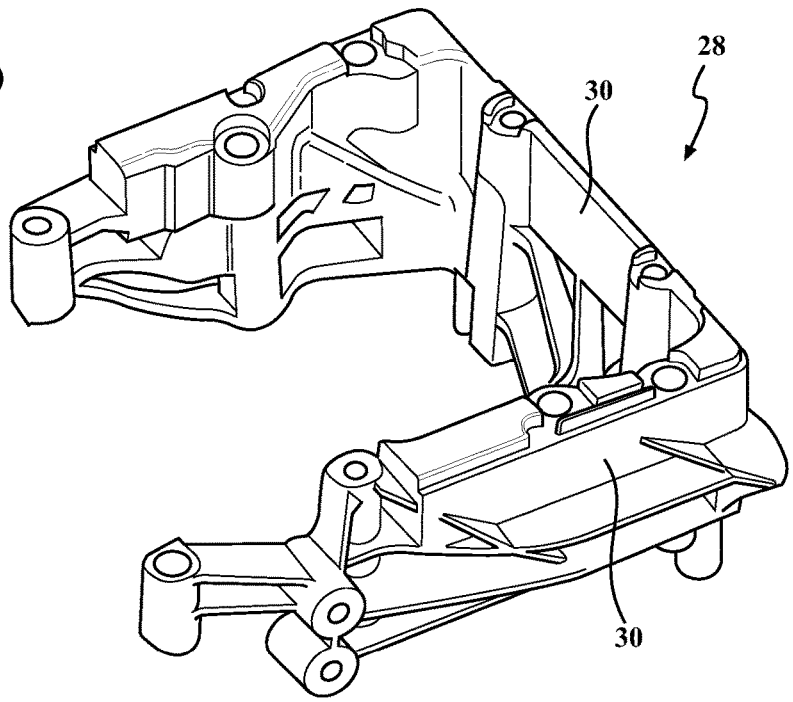
FIG. 1D is yet another perspective front view of the isolated bracket portion of the structural oil pan of FIG. 1A.

FIGS. 1B, 1C, and 1D are perspective views of the isolated bracket portion 28 of the oil pan 20 of FIG. 1A.

Figure 1E:
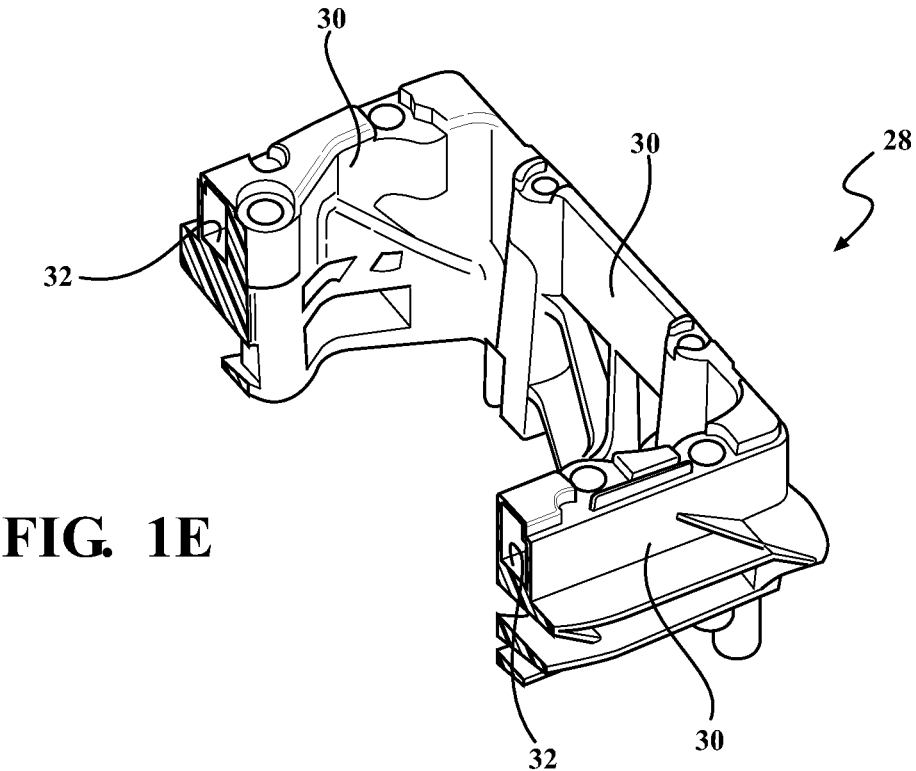
FIG. 1E is a perspective cross-sectional view of the bracket portion and the structural section and cavity thereof of the structural oil pan of FIG. 1A taken along line 1E-1E.
Figure 1F:
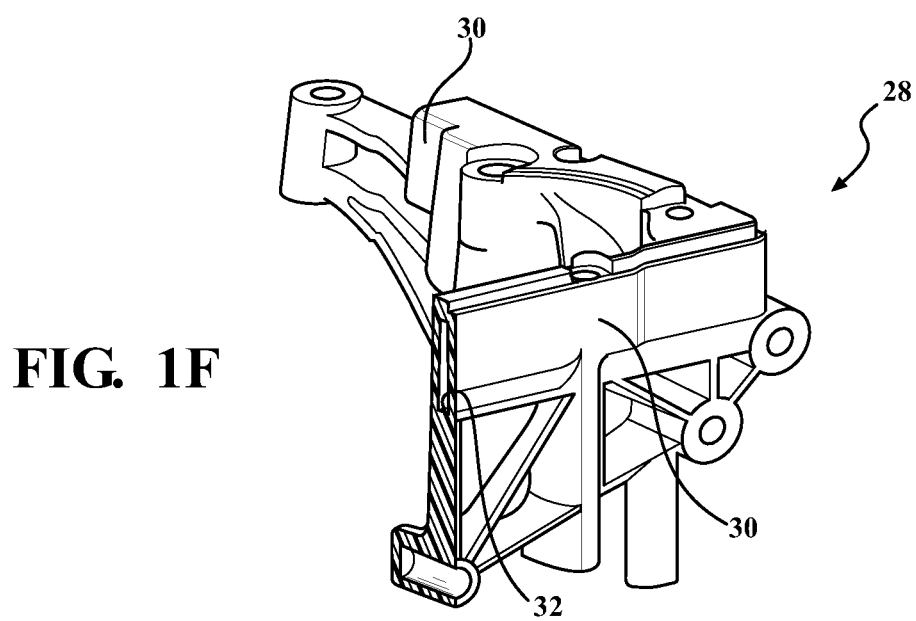
FIG. 1F is a perspective cross-sectional view of the bracket portion and the structural section and cavity thereof of the structural oil pan of FIG. 1A taken along line 1F-1F.
Figure 1G:
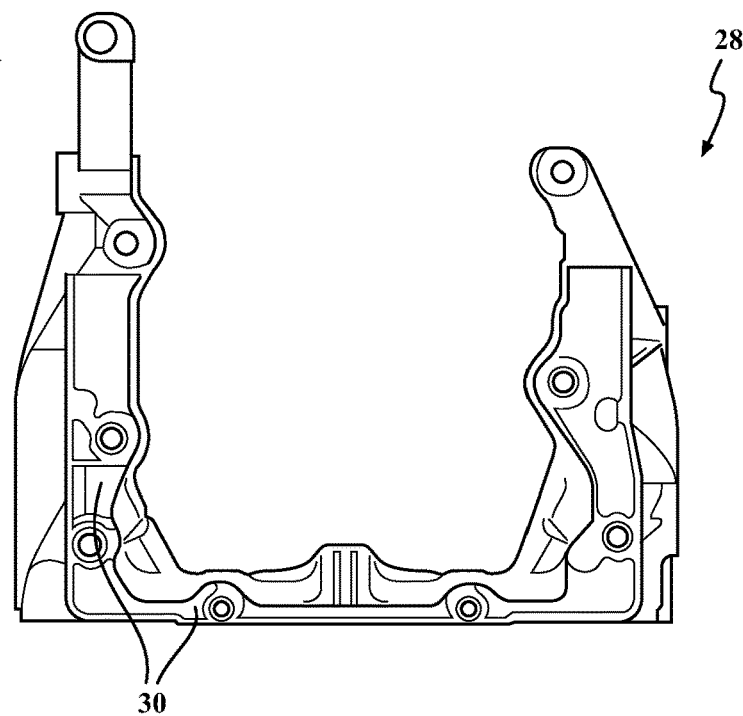
FIG. 1G is a top view of the isolated bracket portion and structural section of the structural oil pan of FIG. 1A.
Figure 1H:
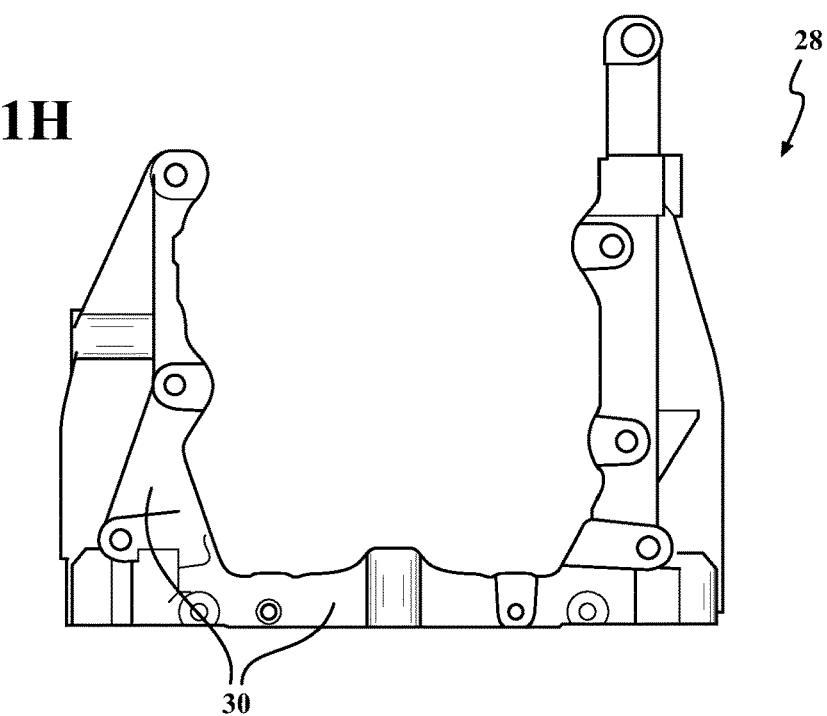
FIG. 1H is a bottom view of the isolated bracket portion and structural section of the structural oil pan of FIG. 1A.
Figure 1I:
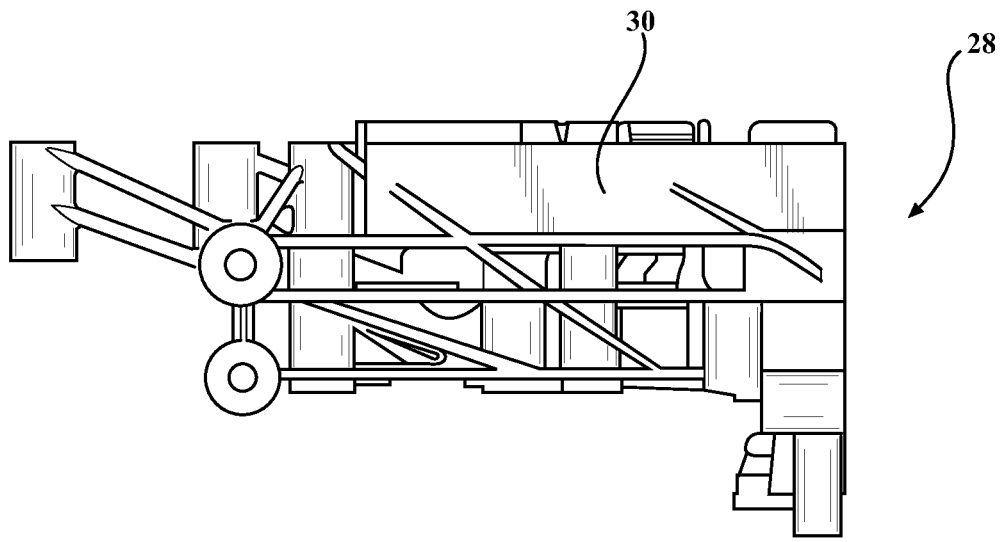
FIG. 1I is a side view of the isolated bracket portion and structural section of the structural oil pan of FIG. 1A.
Figure 1J:
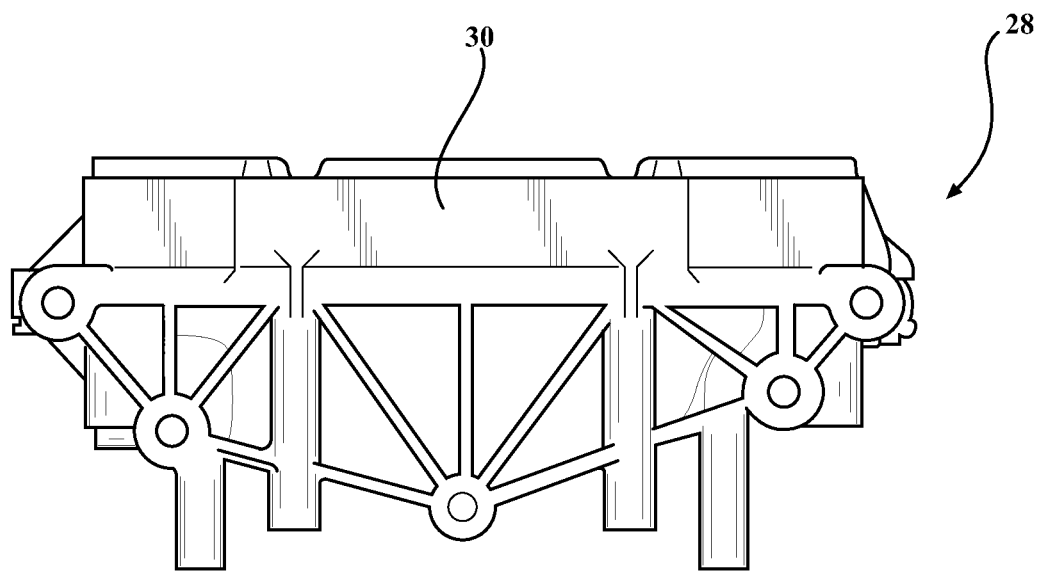
FIG. 1J is an end view of the isolated bracket portion and structural section of the structural oil pan of FIG. 1A.

FIG. 1E is a perspective cross-sectional view of the bracket portion 28 and the structural section 30 and cavity 32 thereof of the oil pan 20 of FIG. 1A taken along line 1E-1E. FIG. 1F is a perspective cross-sectional view of the bracket portion 28 and the structural section 30 and cavity 32 thereof of the oil pan 20 of FIG. 1A taken along line 1F-1F. Notably, the structural section 30 can be on the side walls 52 and/or the back wall 46. FIG. 1G is a top view and FIG. 1H is a bottom view of the isolated bracket portion 28 and structural section 30 of the oil pan 20 of FIG. 1A. Further, FIG. 1I is a side view and FIG. 1J is an end view of the isolated bracket portion 28 and structural section 30 of the oil pan 20 of FIG. 1A.

Figure 2A:
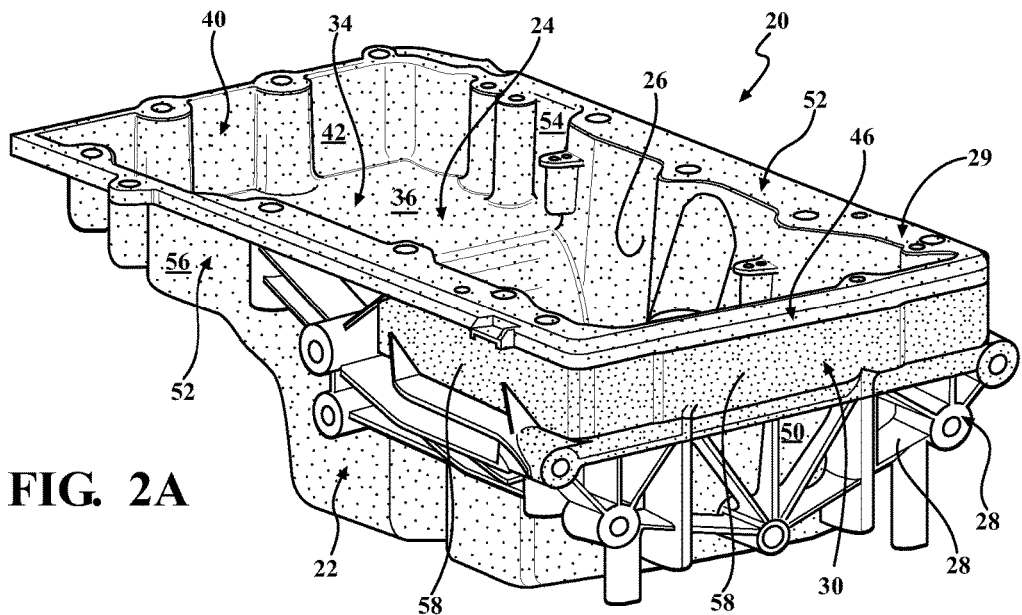
FIG. 2A is a perspective front view of a second embodiment of a structural oil pan having a bracket portion including a structural section and configured for mounting to the vehicle, and a pan portion integrated with the bracket portion and defining an oil reservoir.
Figure 2B:
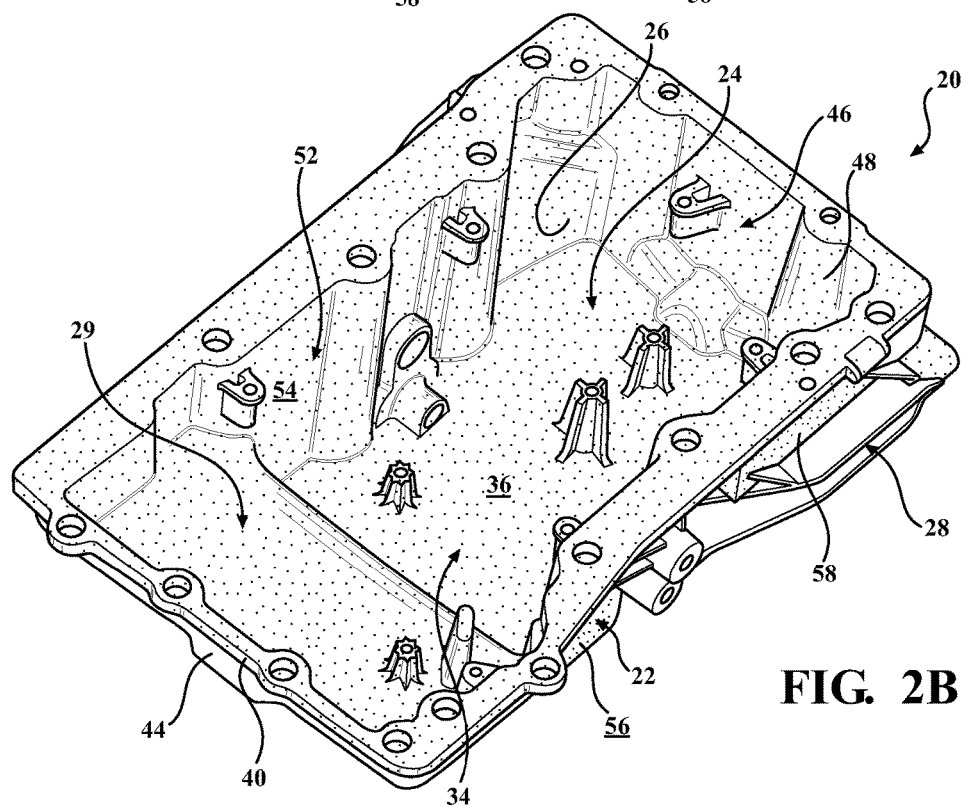
FIG. 2B is a perspective top view of the structural oil pan of FIG. 2A.
Figure 2C:
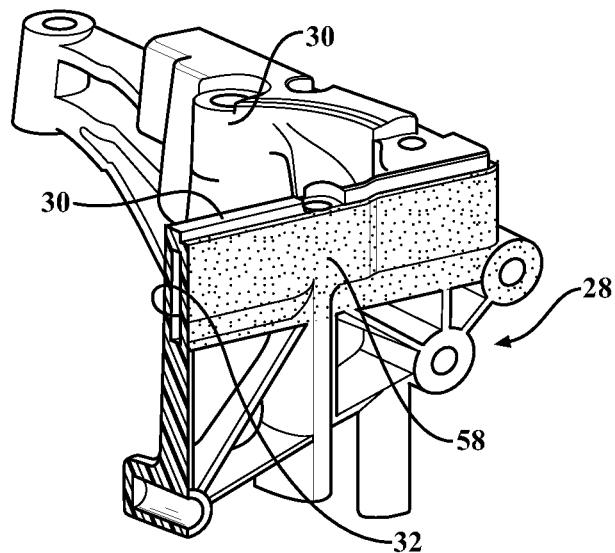
FIG. 2C is a perspective cross-sectional view of the bracket portion and the structural section and cavity thereof of the structural oil pan of FIG. 2A taken along line 2C-2C.
Figure 2D:
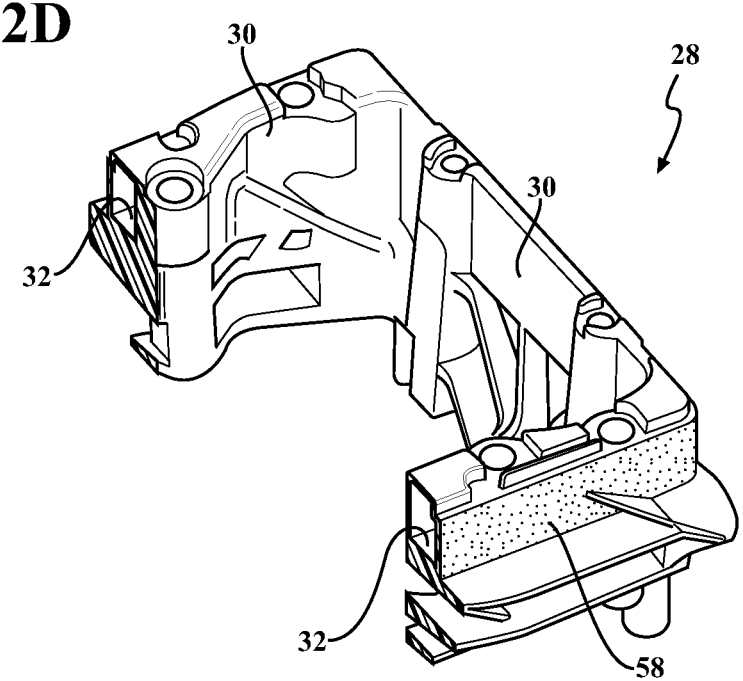
FIG. 2D is a perspective cross-sectional view of the bracket portion and the structural section and cavity thereof of the structural oil pan of FIG. 2A taken along line 2D-2D.

The oil pan 20 of FIG. 2A is similar to the oil pan 20 of FIG. 1A. However, this embodiment of the oil pan 20 includes continuous fiber reinforced tape 58. Suitable CFRT is commercially available from BASF Corporation of Florham Park, N.J. under the trade name ULTRAComp™. The ULTRAComp™ is applied to the exterior surface 24 of the oil pan 20 on the bracket portion 28. FIG. 2B is a perspective top view of the oil pan 20 of FIG. 2A. FIGS. 2C and 2D are perspective cross-sectional views of the bracket portion 28 and the structural section 30 and cavity 32 thereof of the oil pan 20 of FIG. 2A taken along lines 2C-2C, and 2D-2D, respectively.

Figure 3A:
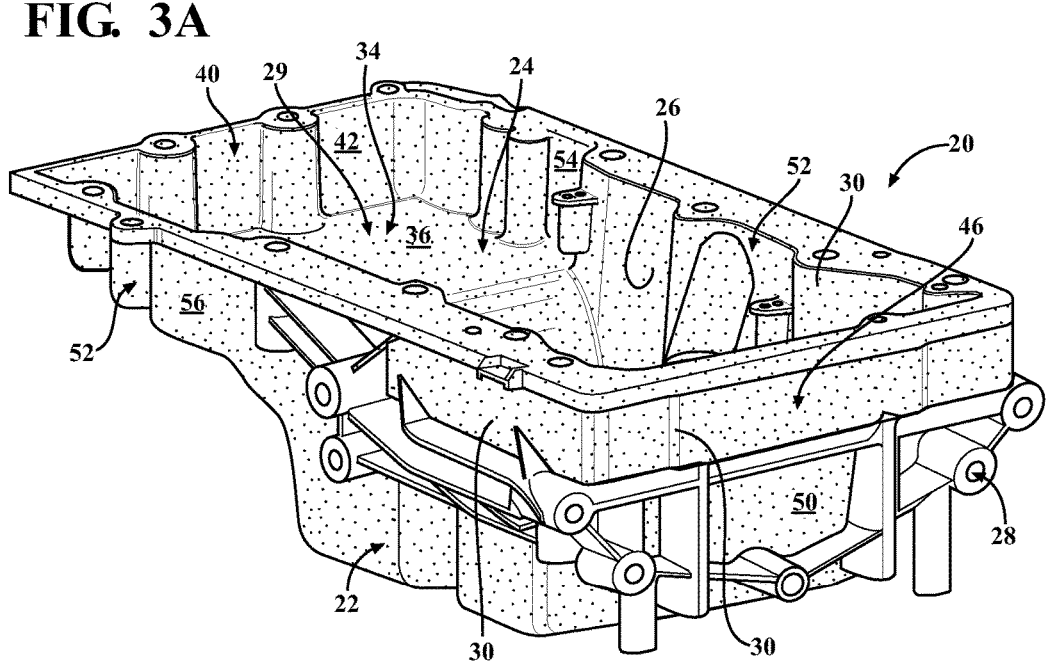
FIG. 3A is a perspective front view of a third embodiment of a structural oil pan having an exterior surface, an interior surface defining an oil reservoir, a cross-brace, and a bracket portion.
Figure 3B:
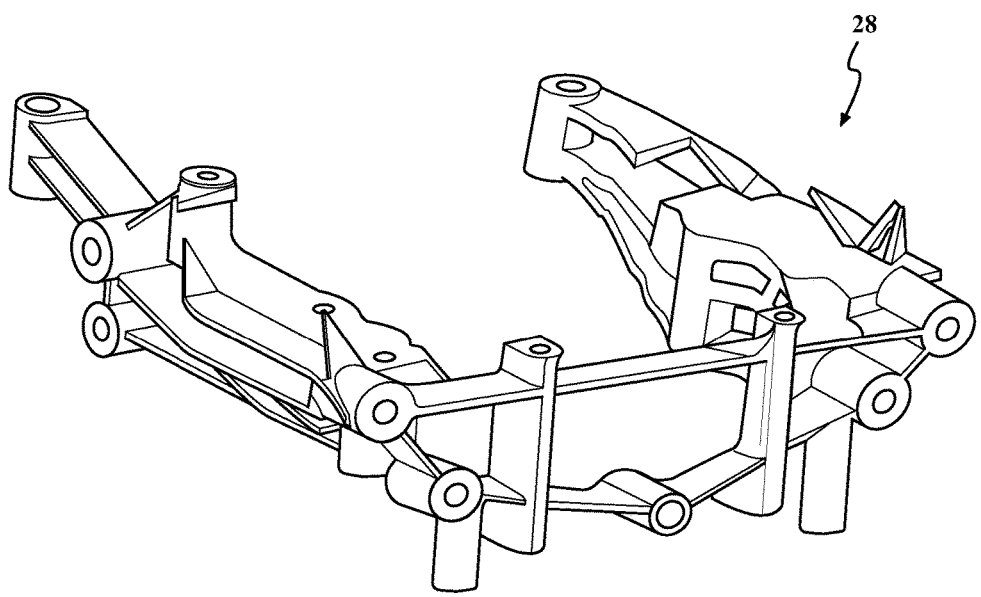
FIG. 3B is a perspective front view of the isolated bracket portion of the structural oil pan of FIG. 3A.
Figure 3C:
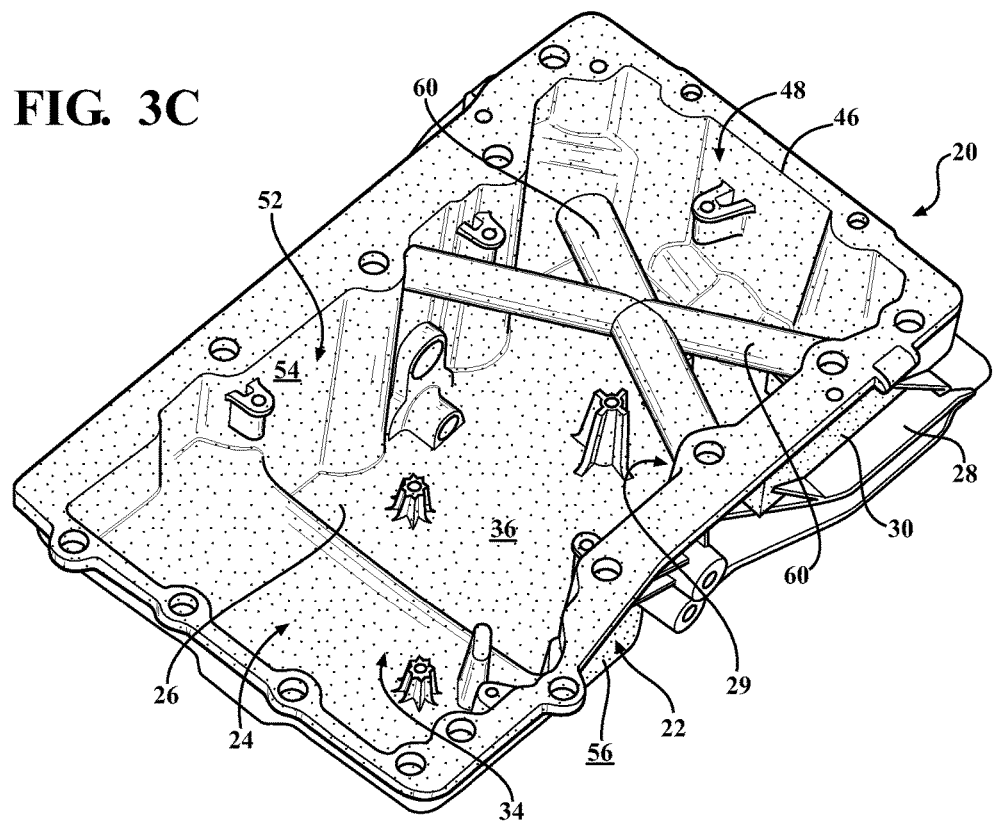
FIG. 3C is a perspective top view of the structural oil pan of FIG. 3A.

FIG. 3A is a perspective front view of another embodiment of the oil pan 20. The oil pan 20 of this embodiment includes a cross brace 60 for additional structural rigidity. Further, the bracket portion 28 of the oil pan 20 of this embodiment does not include the structural section 30 and cavity 32 thereof. Rather, the back wall 46 of the oil pan 20 of this embodiment thereof includes the structural section 30 and cavity 32 thereof. FIG. 3B is a perspective front view of the isolated bracket portion 28 of the oil pan 20 of FIG. 3A and FIG. 3C is a perspective top view of the oil pan 20 of FIG. 3A.

The subject disclosure is directed to a method of forming the structural oil pan 20 via lost core molding. The structural oil pan 20 is just as described in the Figures, the description above, and the Examples.

The method of forming the structural oil pan 20 via lost core molding comprises the step of forming a metal core. The metal core can be formed by casting or molding a metal material into a desired shape. Of course, the shape of the metal core determines the shape of the cavity 32 disposed in the structural section 30 of the oil pan 20. The metal core can be formed with any suitable metal material/metal alloy known in the art. In one embodiment, the metal material is reusable/recyclable.

The method of forming the structural oil pan 20 via lost core molding also includes the step of molding the bracket portion 28 and/or the pan portion 29 about the metal core. This step is typically conducted with injection molding equipment. That is, in this step, the core is placed in a mold and the polymeric material is molded about the core in a desired configuration.

In one embodiment, the method of forming the structural oil pan 20 via lost core molding includes the step of cooling the bracket portion 28 and/or the pan portion 29 having the metal core.

The method of forming the structural oil pan 20 via lost core molding also includes the step of removing the metal core to form the structural section 30 having the cavity 32 therein in at least one of the bracket portion 28 and the pan portion 29. In this step, the metal core is typically melted through the use of induction heat.

In one embodiment, the method of forming the structural oil pan 20 via lost core molding includes the step of recycling the metal material for future use.

The method also includes the step of co-molding the bracket portion and the pan portion together to form the structural oil pan 20. The bracket portion 28 and the pan portion 29 can be co-molded together to form the structural oil pan 20 directly or with various methods known in the art for improving the adhesion between co-molded bodies.

The following examples are intended to illustrate and are not intended to limit the disclosure.

EXAMPLES

The oil pan 20 of FIG. 1A is analyzed for normal modes or noise, vibration, and harshnesss ("NVH") acoustic performance with software having the trade name ABAQUS® which is commercially available from Dassault Systems of Waltham, Mass. The software predicts the NVH performance of any vibration body or vibration bodies. In this particular case, the vibration body is the oil pan 20 of FIG. 1A in a vehicle.

The analysis was conducted in comparative view of an analysis of a composite oil pan comprising an aluminum bracket and a polymeric oil pan.

Table 1 shows an FEA model including the boundary conditions utilized. The individual masses of both the engine block and the transmission housing were modeled at the center-of-gravity ("c.g.") locations for these components, using point masses with ABAQUS®. These c.g. locations of both these components (i.e., the engine block and the transmission housing) were connected via a spring element with 40 KN/mm stiffness. This modeling represented the stiffness interaction between these two components. The mass of the transmission housing was distributed on the bolt holes on the back wall 46 of the engine block and the oil pan 20. The rear face of the engine block was modeled using a rigid plate. The bolts on a flange perimeter of the oil pan 20 were constrained in all degrees-of-freedom ("dof"). To capture the masses correctly, the two engine mounts were also modeled. The engine mount bolt locations were constrained as well in all dof. The oil pan 20, bracket portion 28, and engine mounts were modeled using solid tetrahedral elements while the engine block rear face was modeled rigidly using shell elements within ABAQUS®. Finally, a linear static normal modes analysis card (*FREQUENCY) was used to complete the analysis input deck. This card was defined in the section where in the analysis step related information is defined. The frequency range specified in the *FREQUENCY card was from 10 to 500 Hz and the first 5 modes were requested as an analysis output. Lanczos eigensolver within ABAQUS® software was specified for this simulation.

TABLE 1

| | Model No. | | | | | |
|---|---|---|---|---|---|---|
| | 1 | 2 | 3 | 4 | 5 | 6 (Model 3 with the Bracket and Pan Portion Separated) |
| | Model Description | | | | | |
| FIG. No. | 1 | 4 | 1 | 1 | 4 | 1 |
| Bracket Portion Material | HMG13 | HMG13 | LCF50 | LCF50 | LCF50 | LCF50 |
| Bracket Portion (g) | 1543 | 1543 | 1215 | 1215 | 1215 | 1215 |
| Pan Portion Material | B3zg7osi | HMG13 | B3zg7osi | HMG13 | LCF50 | B3zg7osi |
| Pan Portion (g) | 1323 | 1667 | 1323 | 1667 | 1267 | 1323 |
| Total Weight (g) | 2866 | 3210 | 2538 | 2882 | 2482 | 2538 |
| Acoustic Modeling Performance (120° C.) | | | | | | |
| Mode A (Frequency, Hz) | 96 | 100 | 160 | 166 | 180 | 151 |
| Mode B (Frequency, Hz) | 173 | 187 | 194 | 212 | 224 | 187 |
| Mode C (Frequency, Hz) | 256 | 364 | 261 | 370 | 666 | 239 |

Notably, the oil pans 20 of FIG. 1A modeled were approximately 50% lighter than the all current production, aluminum oil pan, and approximately 20% lighter than a composite oil pan comprising an aluminum bracket and a polymeric oil pan.

The oil pan of FIG. 1A performed well at high temperature (120° C.). Utilizing ULTRAMID® XA3321 (LCF50) material along with positioning the structural section 30 on the bracket portion 28 helped the NVH performance at 120° C.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A method of forming a structural oil pan via lost core molding, the structural oil pan comprising a bracket portion configured for mounting to the vehicle, a pan portion integrated with the bracket portion and defining an oil reservoir, and a structural section formed via the lost core molding and encircling an internal cavity, said method comprising the steps of:
   I. lost core molding by: forming a metal core; molding the bracket portion and/or the pan portion around the metal core; and removing the metal core to form the structural section having the internal cavity therethough in at least one of the bracket portion and the pan portion; and
   II. co-molding the bracket portion and the pan portion together to form the structural oil pan,
   wherein the structural oil pan is formed from a polymeric material.

2. The method of forming a structural oil pan via lost core molding as set forth in claim 1 wherein the structural section is disposed in the bracket portion such that the cavity is defined within the bracket portion.

3. The method of forming a structural oil pan via lost core molding as set forth in claim 1 wherein the structural section is disposed in the pan portion such that the cavity is defined within the pan portion.

4. The method of forming a structural oil pan via lost core molding as set forth in claim 1 wherein the structural section has a cross-sectional shape selected from the group of rectangular, triangular, ovular, and circular.

5. The method of forming a structural oil pan via lost core molding as set forth in claim 1 wherein the polymeric material comprises a polyamide.

6. The method of forming a structural oil pan via lost core molding as set forth in claim 5 further comprising greater than 20 parts by weight of a reinforcing agent based on 100 parts by weight of the polymeric material.

7. The method of forming a structural oil pan via lost core molding as set forth in claim 6 wherein the reinforcing agent comprises a fiber selected from the group of carbon, glass, and combinations thereof.

8. The method of forming a structural oil pan via lost core molding as set forth in claim 1 wherein the polymeric material is further defined as a first polymeric material and a second polymeric material different than the first polymeric material, and wherein the bracket portion comprises the first polymeric material, and the pan portion comprises the second polymeric material.

9. The method of forming a structural oil pan via lost core molding as set forth in claim 8 wherein the first polymeric material comprises polyamide 6.

10. The method of forming a structural oil pan via lost core molding as set forth in claim 9 wherein the first polymeric material comprises carbon fiber in an amount greater than 35 parts by weight based on 100 parts by weight of the first polymeric material.

11. The method of forming a structural oil pan via lost core molding as set forth in claim 10 wherein the carbon fiber has a length of greater than 1 mm.

12. The method of forming a structural oil pan via lost core molding as set forth in claim 8 wherein the second polymeric material comprises polyamide 6.

13. The method of forming a structural oil pan via lost core molding as set forth in claim 12 wherein the second polymeric material comprises glass fiber in an amount greater than 20 parts by weight based on 100 parts by weight of the second polymeric material.

14. The method of forming a structural oil pan via lost core molding as set forth in claim 13 wherein the glass fiber has a length of less than 1 mm.

15. The method of forming a structural oil pan via lost core molding as set forth in claim 12 wherein the second polymeric material has an Izod notched impact strength of greater than 15 KJ/m2 at 23° C. and greater than 10 KJ/m2 at −40° C. when tested in accordance with ISO Test method 179/1 eA.

16. The method of forming a structural oil pan via lost core molding as set forth in claim 1 wherein the pan portion comprises: a floor having an interior surface and an exterior surface and a first floor end and a second floor end with the second floor end opposite the first floor end; a front wall having an interior surface and an exterior surface, and extending outwardly from the first floor end of the floor; a back wall having an interior surface and an exterior surface, and extending outwardly from the second floor end of the floor; and a pair of side walls each having an interior surface and an exterior surface, and extending outwardly from the floor, the side walls extending substantially parallel with one another and connected to and substantially perpendicular with the front and back walls; wherein the interior surfaces of the floor and the walls define the oil reservoir.

17. The method of forming a structural oil pan via lost core molding as set forth in claim 16 wherein the structural section is disposed in at least one of the walls of the pan portion.

18. The method of forming a structural oil pan via lost core molding as set forth in claim 16 wherein the bracket portion is integrated with the side walls and the back wall of the pan portion.

19. The method of forming a structural oil pan via lost core molding as set forth in claim 18 wherein the structural section is disposed in the bracket portion adjacent to the exterior surface of at least one of the walls of the pan portion.

* * * * *